(12) United States Patent
Teglia

(10) Patent No.: US 8,666,067 B2
(45) Date of Patent: Mar. 4, 2014

(54) CRYPTOGRAPHIC COUNTERMEASURE METHOD BY DERIVING A SECRET DATA

(75) Inventor: Yannick Teglia, Belcodene (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 121 days.

(21) Appl. No.: 13/286,962

(22) Filed: Nov. 1, 2011

(65) Prior Publication Data

US 2012/0106732 A1 May 3, 2012

(30) Foreign Application Priority Data

Nov. 2, 2010 (FR) ..................................... 10 04294

(51) Int. Cl.
*H04L 29/06* (2006.01)

(52) U.S. Cl.
USPC ................ 380/28; 713/189; 713/187; 380/37

(58) Field of Classification Search
USPC .......................................................... 380/28
See application file for complete search history.

(56) References Cited

U.S. PATENT DOCUMENTS

| | | | | |
|---|---|---|---|---|
| 6,747,580 | B1 * | 6/2004 | Schmidt ........................... | 341/50 |
| 7,397,916 | B2 * | 7/2008 | Johnson et al. .................. | 380/28 |
| 7,961,876 | B2 * | 6/2011 | Ding ................................ | 380/30 |
| 8,369,522 | B2 * | 2/2013 | Shirai et al. ..................... | 380/44 |
| 2006/0029224 | A1 | 2/2006 | Baek et al. ....................... | 380/30 |
| 2006/0045265 | A1 * | 3/2006 | Matsui et al. .................... | 380/37 |
| 2009/0245510 | A1 * | 10/2009 | Ciet et al. ........................ | 380/29 |
| 2010/0002872 | A1 * | 1/2010 | Shibutani et al. ................ | 380/28 |
| 2010/0061548 | A1 * | 3/2010 | Shirai et al. ..................... | 380/28 |
| 2010/0266122 | A1 * | 10/2010 | Suzaki et al. .................... | 380/28 |
| 2012/0219150 | A1 * | 8/2012 | Suzaki et al. .................... | 380/28 |

FOREIGN PATENT DOCUMENTS

EP 2 326 041 A1 5/2011

OTHER PUBLICATIONS

Coron, "Resistance against Differential Power Analysis for Elliptic Curve Cryptosystems," *Cryptographic Hardware and Embedded Systems International Workshop XX*, Aug. 1, 1999, pp. 292-302.

Kocher, "Timing Attacks on Implementations of Diffie-Hellman, RSA, DSS, and Other Systems," *Advances in Cryptology—CRYPTO '96—16th Annual International Cryptology Conference*, Santa Barbara, CA, Aug. 18-22, 1996, pp. 104-113.

* cited by examiner

*Primary Examiner* — Mohammad L Rahman
(74) *Attorney, Agent, or Firm* — Seed IP Law Group PLLC

(57) ABSTRACT

A method of protecting a circuit from attacks aiming to discover secret data used during the execution of a cryptographic calculation by the circuit, by, executing a transformation calculation implementing a bijective transformation function, receiving as input a secret data, and supplying a transformed data, executing a cryptographic calculation receiving as input a data to process and the transformed data, and executing an inverse transformation calculation receiving as input the result of the cryptographic calculation, and supplying a result that the cryptographic calculation would have supplied if it had been applied to the data to process and directly to the secret data, the data to process belong to a stream of a multiplicity of data, the transformed data being supplied as input to the cryptographic calculation for all the data of the stream.

23 Claims, 1 Drawing Sheet

CRYPTOGRAPHIC COUNTERMEASURE METHOD BY DERIVING A SECRET DATA

BACKGROUND

1. Technical Field

The present disclosure relates to a countermeasure method to protect sensitive data circulating in an electronic circuit from attacks aiming to discover these data. The present disclosure applies, for example, to microcircuit cards, to decoder boxes ("set top box"), and more generally to any device manipulating secret data or implementing cryptographic functions.

2. Description of the Related Art

The sensitive data may be in particular encryption or decryption keys, and more generally cryptographic data used or generated during cryptographic calculations, such as intermediate data of such calculations, and identifiers which must be kept secret.

Electronic circuits manipulating sensitive data are sometimes subjected to attacks aiming to determine these data. Among the known attacks, attacks of the SPA (Simple Power Analysis) or DPA (Differential Power Analysis) types comprise performing numerous measurements of currents and of voltages entering and leaving the circuit during the execution of a program or during the processing of data by the circuit, with different input data. The obtained measurements are exploited by statistical analyses aiming to reveal correlations in order to deduce the secret data processed or used by the circuit. With this same goal, attacks of the EMA (Electromagnetic Analysis) and DEMA (Differential Electromagnetic Analysis) types are based on the analysis of electromagnetic radiation emitted by the circuit.

In order to fight against these varied types of attacks, numerous solutions all different from each other have been developed. This disclosure relates particularly to those that aim to prevent statistical analysis attacks from discovering secret data by means of correlation.

To this end, it is known to use random numbers to mask the cryptographic calculations. For example, during a modular exponentiation of the form ($M^d$ mod N, M being a data to encrypt and d being secret data), currently used in certain cryptographic calculations, it is known to add a random number r to the secret data d and then using it as an exponent in the modular exponentiation calculation ($M^{d+r}$ mod N). To obtain the result of the sought exponentiation operation ($M^d$ mod N), the component resulting from the introduction of the random number is removed by applying a modular exponentiation calculation to the random number with the sign changed beforehand ($M^{-r}$ mod N), then multiplying the results obtained by the two modular exponentiations.

Instead of adding a random number to the secret data, it is also known to multiply it by a random number r. In this case, the result of the sought modular exponentiation ($M^d$ mod N) is obtained by calculating the inverse of the random number 1/r and by performing a second modular exponentiation calculation to power 1/r, applied to the result of the first modular exponentiation calculation (($M^{dr}$ mod N)$^{1/r}$ mod N).

These solutions have the disadvantages of requiring a high-quality random number generator, of storing temporarily the result of the first modular exponentiation calculation, and of adding a second modular exponentiation calculation and a multiplication or an inverse calculation.

It is also known to add to the secret data d used as an exponent, a term of the form r·φ(N) such that the modular exponentiation calculation using the obtained sum as exponent ($M^{d+r\cdot\phi(N)}$ mod N), supplies a result identical to the modular exponentiation calculation using only the secret data as exponent ($M^d$ mod N). This solution also requires a high-quality random number generator to determine the value of r. It is also necessary to know the factor φ(N) which allows the result of the modular exponentiation to not change, which is not always the case according to the application.

Instead of modifying the secret data before proceeding with the modular exponentiation calculation, it has also been envisaged to modify the data to encrypt M before the exponentiation calculation by multiplying it by a random number r. The modular exponentiation calculation thus supplies the value ((M·r)$^d$ mod N). To obtain the sought calculation result, it is therefore necessary to calculate the quantity ($r^{-d}$ mod N) and to multiply this quantity by the result of the first modular exponentiation calculation. This solution has the same disadvantages of the previously-described solutions.

BRIEF SUMMARY

An embodiment relates to a method of protecting a circuit from attacks aiming to discover secret data used during the execution of a cryptographic calculation by the circuit, the method comprising steps of: executing a transformation calculation implementing a bijective transformation function, receiving as input a secret data, and supplying a transformed data; executing a cryptographic calculation receiving as input a data to process and the transformed data; and executing an inverse transformation calculation receiving as input the result of the cryptographic calculation, and supplying a result that the cryptographic calculation would have supplied if it had been applied to the data to process and directly to the secret data; wherein the data to process belong to a stream comprising a multiplicity of data to process, the transformed data being supplied as input to the cryptographic calculation for all the data of the data stream to process.

An embodiment prevents the discovery of secret data during cryptographic calculations, without requiring a random number generator and a memory to store intermediate results.

According to one embodiment, the method comprises steps of storing the transformed data and of reading the stored transformed data, for each data of the stream to process, the transformation calculation of the secret data into transformed data being done a single time for the data of the stream to process.

According to one embodiment, the method comprises steps of receiving and of executing, by the circuit, a selection order for selecting a new transformation function and an inverse transformation function from among a group of pairs of bijective functions of transformation and of corresponding inverse transformation, of calculating a new transformed data resulting from the application of the new transformation function selected to the secret data, of using the new transformed data as input of the cryptographic calculation applied to each of the data of a data stream to process received following the selection order.

According to one embodiment, the method comprises steps of receiving, by the circuit, a new pair of transformation and corresponding inverse transformation functions in the form of executable sequences of instructions, of executing the received transformation function applied to the secret data to obtain a new transformed data, and of using the new transformed data as input of the cryptographic calculation applied to each of the data of a data stream to process received following the reception of the pair of transformation functions.

According to one embodiment, the cryptographic calculation comprises a modular exponentiation calculation of the data to process, using the secret data or the transformed data as exponent, or else the multiplication of the cryptographic elliptical curve of the data to process by the transformed data or the secret data.

According to one embodiment, the transformation function is a multiplication modulo N by a positive or negative whole number, or the inverse of such a number.

An embodiment relates to a data stream processing circuit, configured to implement an embodiment of the methods disclosed herein.

According to one embodiment, the circuit comprises a secure cryptographic calculation circuit configured to store a secret data and to execute the transformation calculation of the secret data and the cryptographic calculation on a data of a data stream to process.

According to one embodiment, the secure cryptographic calculation circuit is configured to store the transformed data resulting from the transformation calculation applied to the secret data, and to use the stored transformed data at each cryptographic calculation.

According to one embodiment, the secure cryptographic calculation circuit is configured to store several pairs of transformation and corresponding inverse transformation functions, to receive selection orders of a new pair of functions from among the stored pairs of functions, and to calculate a new transformed data resulting from the application of the selected transformation function to the secret data.

According to one embodiment, the circuit is configured to receive a new pair of transformation and corresponding inverse transformation functions in the form of executable sequences of instructions, to execute the received transformation function applied to the secret data to obtain a new transformed data, and to use the new transformed data as input of the cryptographic calculation applied to each of the data of a data stream to process.

In an embodiment, a method comprises: applying, by one or more configured processing devices, a bijective transformation function on secret data, generating transformed data; applying, by the one or more configured processing devices, a cryptographic calculation function on a set of data of an input data stream and the transformed data, generating a second data stream, the set of data of the input data stream comprising a plurality of data; and applying, by the one or more configured processing devices, an inverse transformation function on the second data stream, generating a results data stream, wherein the results data stream corresponds to a data stream that would have been generated by application of the cryptographic calculation function on the set of data of the input data stream and the secret data. In an embodiment, the method comprises storing the transformed data, wherein the applying the cryptographic calculation function on the set of data of the input data stream and the transformed data comprises, for at least some of the data of the set of data of the input data stream, reading the stored transformed data and applying cryptographic calculation function on the at least some of the data of the set of data of the input data stream and the read transformed data. In an embodiment, the method comprises: selecting a second bijective transformation function and a second inverse transformation function from among a group of pairs of bijective transformation functions and of corresponding inverse transformation functions; applying the second bijective transformation function on the secret data, generating second transformed data; applying the cryptographic calculation function on a second set of data of the input data stream and the second transformed data, generating a third data stream; and applying the second inverse transformation function on the third data stream, generating a second results data stream, wherein the second results data stream corresponds to a data stream that would have been generated by application of the cryptographic calculation function on the second set of data of the input data stream and the secret data. In an embodiment, the method comprises: receiving an indication to select a new bijective transformation function and a new inverse transformation function; responding to the indication by selecting a new bijective transformation function and a new inverse transformation function from among a group of pairs of bijective transformation functions and of corresponding inverse transformation functions; applying the selected new bijective transformation function on the secret data, generating new transformed data; applying the cryptographic calculation function on a subsequent set of data of the input data stream and the new transformed data, generating a third data stream; and applying the new inverse transformation function on the third data stream, generating a second results data stream, wherein the second results data stream corresponds to a data stream that would have been generated by application of the cryptographic calculation function on the subsequent set of data of the input data stream and the secret data. In an embodiment, the results data stream is equal to the data stream that would have been generated by application of the cryptographic calculation function on the set of data of the input data stream and the secret data. In an embodiment, the method comprises: receiving a new bijective transformation function and a new inverse transformation function; applying the new bijective transformation function on the secret data, generating new transformed data; applying the cryptographic calculation function on a subsequent set of data of the input data stream and the new transformed data, generating a third data stream; and applying the new inverse transformation function on the third data stream, generating a second results data stream, wherein the second results data stream corresponds to a data stream that would have been generated by application of the cryptographic calculation function on the subsequent set of data of the input data stream and the secret data. In an embodiment, the receiving the new bijective transformation function and the new inverse transformation function comprises: receiving a set of executable instructions; and executing the received set of executable instructions. In an embodiment, the applying the cryptographic calculation function on the set of data of the input data stream and the transformed data comprises one of: applying a modular exponentiation calculation on the set of data of the input data stream, using the transformed data as an exponent; and multiplying a cryptographic elliptical curve of set of data of the input data stream by the transformed data. In an embodiment, the bijective transformation function comprises one of: a multiplication modulo N by a non-zero whole number; and a multiplication modulo N by an inverse of a non-zero whole number, wherein N is a whole number. In an embodiment, the secret data comprises an encryption key.

In an embodiment, a non-transitory computer-readable medium's contents configure one or more processing devices to perform a method, the method comprising: applying a bijective transformation function on secret data, generating transformed data; applying a cryptographic calculation function on a set of data of an input data stream and the transformed data, generating a second data stream, the set of data of the input data stream comprising a plurality of data; and applying an inverse transformation function on the second data stream, generating a results data stream, wherein the results data stream corresponds to a data stream that would have been generated by application of the cryptographic calculation function on the set of data of the input data stream and the secret data. In an embodiment, the method comprises: selecting a second bijective transformation function and a second inverse transformation function; applying the second bijective transformation function on the secret data, generating second transformed data; applying the cryptographic calculation function on a second set of data of the input data stream and the second transformed data, generating a third data stream; and applying the second inverse transformation function on the third data stream, generating a second results data stream. In an embodiment, the results data stream is equal to the data stream that would have been generated by application of the cryptographic calculation function on the set of data of the input data stream and the secret data.

In an embodiment, a system comprises: means for applying a bijective transformation function on secret data; means for applying a cryptographic calculation function on a set of data of an input data stream and an output of the means for applying the bijective transformation function; and means for applying an inverse transformation function on an output of the means for applying the cryptographic calculation function, wherein an output of the means for applying the inverse transformation function corresponds to a data stream that would have been generated by application of the cryptographic calculation function on the set of data of the input data stream and the secret data. In an embodiment, the system comprising one or more processing devices configured to implement the means for applying the bijective transformation function, the means for applying the cryptographic calculation function and the means for applying an inverse transformation function. In an embodiment, the output of the means for applying the inverse transformation function is equal to a data stream that would have been generated by application of the cryptographic calculation function on the set of data of the input data stream and the secret data.

In an embodiment, a circuit comprises: one or more memories; and one or more processing devices configured to: apply a bijective transformation function on secret data, generating transformed data; apply a cryptographic calculation function on a set of data of an input data stream and the transformed data, generating a second data stream, the set of data of the input data stream comprising a plurality of data; and apply an inverse transformation function on the second data stream, generating a results data stream, wherein the results data stream corresponds to a data stream which would be generated by application of the cryptographic calculation function on the set of data of the input data stream and the secret data. In an embodiment, the one or more processing devices comprises a secure cryptographic calculation circuit configured to: store the secret data; apply the bijective transformation function; and apply the cryptographic calculation function. In an embodiment, the secure cryptographic calculation circuit is configured to store the transformed data and to use the stored transformed data at a plurality of sequential applications of the cryptographic calculation function. In an embodiment, the secure cryptographic calculation circuit is configured to: store a plurality of pairs of bijective transformation functions and corresponding inverse transformation functions; respond to received indications to select a new pair of functions from among the stored pairs of functions by selecting a second bijective transformation function and a corresponding second inverse transformation function from among the stored plurality of pairs; and apply the new bijective transformation function on the secret data, generating new transformed data. In an embodiment, the one or more processing devices are configured to respond to receipt of a new bijective transformation function and a new inverse transformation function by: applying the new bijective transformation function on the secret data, generating new transformed data; applying the cryptographic calculation function on a subsequent set of data of the input data stream and the new transformed data, generating a third data stream; and applying the new inverse transformation function on the third data stream, generating a second results data stream, wherein the second results data stream corresponds to a data stream that would have been generated by application of the cryptographic calculation function on the subsequent set of data of the input data stream and the secret data. In an embodiment, the one or more processing devices are configured to execute a received set of executable instructions containing the new bijective transformation function and the new inverse transformation function.

BRIEF DESCRIPTION OF THE SEVERAL VIEWS OF THE DRAWINGS

Embodiment examples will be described in the following, in a non-limiting manner in relation with the appended drawings, among which.

DETAILED DESCRIPTION

Figure 1:
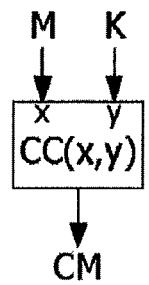
FIG. 1 shows, in block form, a conventional cryptographic calculation.

FIG. 1 shows a cryptographic calculation performed by an electronic circuit. Cryptographic calculation CC applies a mathematical function CC to a data to process M and to a secret data K. A result CM=CC(M, K) is supplied. Cryptographic calculation CC may be an encryption or decryption calculation, symmetrical or asymmetrical.

Figure 2:
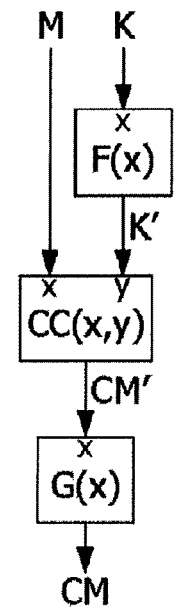
FIG. 2 shows, in block form, a cryptographic calculation modified according to an embodiment, and FIG. 3 schematically shows a system comprising a circuit configured to implement the modified cryptographic calculation.

FIG. 2 shows a cryptographic calculation performed by an electronic circuit, according to an embodiment. The cryptographic calculation shown in FIG. 2 supplies a result identical to that of FIG. 1. To this end, the calculation of FIG. 2 first applies a transformation function F, which is a bijective mathematical function, to secret data K. Function F applied to secret data K supplies a transformed data K'. Data to process M and transformed data K' obtained are supplied as input of cryptographic calculation CC. Thus, calculation CC supplies a result CM'=CC(M, K'). To obtain the same result CM as that of the calculation of FIG. 1, the calculation of FIG. 2 applies an "inverse" mathematical function G of function F to result CM'. Thus, it supplies result CM which would have been obtained by applying cryptographic calculation CC to the data to process M and directly to secret data K, that is to say, not to data transformed by the function F. Thus, the cryptographic calculation of FIG. 2 may be represented by the following equation:

$$CM=CC(M, K)=G(CC(M, F(K)))\qquad(1)$$

On the mathematical level, if function F is bijective, a function G exists that satisfies equation (1).

Equation (1) may apply in particular to cryptographic calculations comprising one or more modular exponentiation calculations, in the following manner:

$$CM=M^K \bmod N=G(M^{F(K)} \bmod N)\qquad(2)$$

In this case, functions F and G are modulo N mathematical functions. Functions F and G may be simple mathematical functions, such as for function F a multiplication modulo N by a positive or negative whole number A or the inverse B=1/A of such a number, and for function G an exponentiation modulo N to the power 1/A. Equation (2) may apply to any cryptographic calculation implementing modular exponentiation calculations, such as RSA, Diffie Hellman, and El Gamal.

Equation (1) may also apply to cryptography based on elliptical curves, in the following manner:

$$CM=K\times M=G(F(K)\times M) \quad (3)$$

wherein the operator "×" is a multiplication modulo N in the mathematical group constituted by the points of a previously chosen elliptical curve, and N is a prime number corresponding to a point of the mathematical group corresponding to the chosen elliptical curve. Functions F and G are thus functions in the mathematical group associated with the chosen elliptical curve. Functions F and G may be simple mathematical functions in the group of points of the chosen elliptical curve, such as for function F a multiplication modulo N by a positive or negative whole number A, and for function G a multiplication by the inverse 1/A of number A (or number A raised to the power −1 modulo N).

Figure 3:
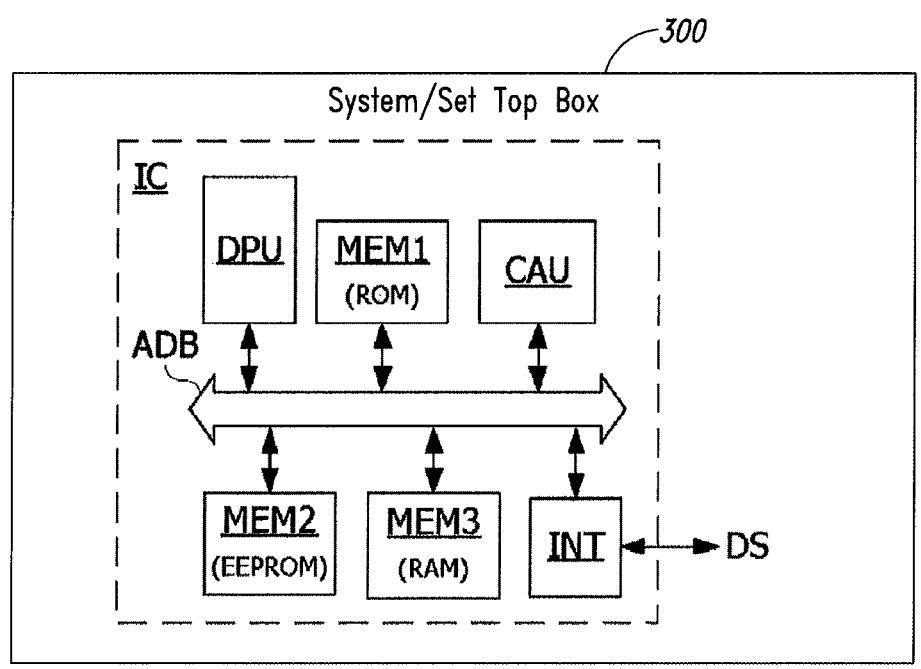

FIG. 3 shows an example of a system 300, as illustrated a set-top box, comprising a circuit IC implementing the cryptographic calculation of FIG. 2. In FIG. 3, circuit IC comprises a data processing unit DPU, one or more memories MEM1, MEM2, MEM3, a secure cryptographic calculation circuit CAU, and an interface circuit INT allowing circuit IC to communicate with external circuits. Unit DPU, memories MEM1 to MEM3, and circuits CAU and INT are interconnected by the intermediary of a data transmission bus ADB. Memories MEM1 and MEM2 are for example nonvolatile memories. Memory MEM1 may be of the ROM type and memory MEM2 of the re-writable type (EEPROM). Memory MEM3 may be a volatile memory. Circuit IC is configured to receive and/or emit data streams DS, the data of which are processed by circuit CAU, before their emission or after their reception by circuit INT. Circuit CAU supplies, for example to unit DPU, processed data CM resulting from the application of cryptographic calculation CC to data M of stream DS. Circuit CAU transforms each data M of stream DS into a derived data CM corresponding to the result of cryptographic calculation CC(M,K) applied to data M and to secret data K, which may be stored in the circuit CAU. Circuit IC may be a video decoder circuit (set top box) or a microcircuit integrated for example in a chip card, etc.

According to one embodiment, circuit CAU calculates each derived data CM by applying equation (1), (2), or (3) to each data M of stream DS, the pair of functions (F, G), and secret data K remaining secret and unchanged for each data M of the stream to process DS. In this manner, if circuit IC undergoes an attack based on a statistical analysis of measures performed by circuit IC, aiming to reveal correlations, the attack may lead to the discovery not of secret data K, but of transformed data K'.

It is to be noted that in an embodiment, the pair of functions (F, G) is not changed with each data to process, because otherwise an attack cannot lead by correlation to the discovery of a secret or transformed data. Consequently, transformed data K' is used, in place of secret data K in a series of cryptographic calculations CC, a minimum number of times sufficient so that correlations may be established by the known attacks.

According to one embodiment, transformed data K'=F(K) is calculated once to process a first data of stream DS, and is stored by circuit CAU. The stored transformed data is read by circuit CAU to process all other data of stream DS.

According to one embodiment, functions F and G are executed by circuit CAU. According to another embodiment, transformation function F is applied to secret data K by circuit CAU, and corresponding inverse function G is applied by another circuit such as unit DPU to transformed data CM'=CC(M, K').

According to one embodiment, a group of several pairs of functions F and G is stored by circuit CAU. Circuit IC can receive, by the intermediary of interface circuit INT, an order to change the pair of functions (F, G) used. Circuit CAU thus selects one of the pairs of functions (F, G), which it stores. This selection may random or imposed by an order received by interface circuit INT.

In this manner, if a doubt exists as to whether potential attackers of circuit IC have determined functions F and G, these functions may be changed remotely by users of circuit IC.

According to one embodiment, functions F and G may be stored by circuit IC (in memory MEM2 or by circuit CAU) in the form of sequences of executable instructions. These stored instruction sequences may be modified by transmitting new instruction sequences implementing another pair of functions F and G to circuit IC. The transmission of these instruction sequences to circuit IC may be done in a secure manner, for example in encrypted form with the aid of a secret key shared with the user of circuit IC who emitted the sequences of instructions, or with the aid of a key belonging to a pair of asymmetric keys.

Some embodiments may take the form of or comprise computer program products. For example, according to one embodiment there is provided a computer readable medium comprising a computer program adapted to perform one or more of the methods or functions described above. The medium may be a non-transitory medium such as a physical storage medium, for example, a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the systems and/or modules may be implemented or provided in other manners, such as at least partially in firmware and/or hardware, including, but not limited to, one or more application-specific integrated circuits (ASICs), digital signal processors, discrete circuitry, logic gates, state machines, standard integrated circuits, controllers (e.g., programmed by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
applying, by one or more configured processing devices, a bijective transformation function on secret data, generating transformed data;
applying, by the one or more configured processing devices, a cryptographic calculation function on a set of data of an input data stream and the transformed data, generating a second data stream, the set of data of the input data stream comprising a plurality of data; and
applying, by the one or more configured processing devices, an inverse transformation function corresponding to the bijective function on the second data stream, generating a results data stream, wherein the results data stream corresponds to application of the cryptographic calculation function on the set of data of the input data stream and the secret data, and the bijective transformation function and the inverse transformation function are selected from a group of pairs of bijective transformation functions and corresponding inverse transformation functions.

2. The method according to claim 1, comprising storing the transformed data, wherein the applying the cryptographic calculation function on the set of data of the input data stream and the transformed data comprises, for at least some of the data of the set of data of the input data stream, reading the stored transformed data and applying cryptographic calculation function on the at least some of the data of the set of data of the input data stream and the read transformed data.

3. The method according to claim 1, comprising:
selecting a second bijective transformation function and a second inverse transformation function from among the group of pairs of bijective transformation functions and of corresponding inverse transformation functions;
applying the second bijective transformation function on the secret data, generating second transformed data;
applying the cryptographic calculation function on a second set of data of the input data stream and the second transformed data, generating a third data stream; and
applying the second inverse transformation function on the third data stream, generating a second results data stream, wherein the second results data stream corresponds to application of the cryptographic calculation function on the second set of data of the input data stream and the secret data.

4. The method according to claim 1, comprising:
receiving an indication to select a new bijective transformation function and a new inverse transformation function;
responding to the indication by selecting a new bijective transformation function and a new inverse transformation function from among the group of pairs of bijective transformation functions and of corresponding inverse transformation functions;
applying the selected new bijective transformation function on the secret data, generating new transformed data;
applying the cryptographic calculation function on a subsequent set of data of the input data stream and the new transformed data, generating a third data stream; and
applying the new inverse transformation function on the third data stream, generating a second results data stream, wherein the second results data stream corresponds to application of the cryptographic calculation function on the subsequent set of data of the input data stream and the secret data.

5. The method of claim 1 wherein the results data stream is equivalent to application of the cryptographic calculation function on the set of data of the input data stream and the secret data.

6. The method according to claim 1, comprising:
receiving a new bijective transformation function and a new inverse transformation function;
applying the new bijective transformation function on the secret data, generating new transformed data;
applying the cryptographic calculation function on a subsequent set of data of the input data stream and the new transformed data, generating a third data stream; and
applying the new inverse transformation function on the third data stream, generating a second results data stream, wherein the second results data stream corresponds to application of the cryptographic calculation function on the subsequent set of data of the input data stream and the secret data.

7. The method of claim 6 wherein the receiving the new bijective transformation function and the new inverse transformation function comprises:
receiving a set of executable instructions; and
executing the received set of executable instructions.

8. A method according to claim 1, wherein the applying the cryptographic calculation function on the set of data of the input data stream and the transformed data comprises one of:
applying a modular exponentiation calculation on the set of data of the input data stream, using the transformed data as an exponent; and
multiplying a cryptographic elliptical curve of set of data of the input data stream by the transformed data.

9. The method according to claim 1, wherein the bijective transformation function comprises one of:
a multiplication modulo N by a non-zero whole number; and
a multiplication modulo N by an inverse of a non-zero whole number, wherein N is a whole number.

10. The method of claim 1 wherein the secret data comprises an encryption key.

11. A non-transitory computer-readable medium containing contents to configure one or more processing devices to perform a method, the method comprising:
applying a bijective transformation function on secret data, generating transformed data;
applying a cryptographic calculation function on a set of data of an input data stream and the transformed data, generating a second data stream, the set of data of the input data stream comprising a plurality of data; and
applying an inverse transformation function corresponding to the bijective transformation function on the second data stream, generating a results data stream, wherein the results data stream corresponds to application of the cryptographic calculation function on the set of data of the input data stream and the secret data, and the bijective transformation function and the inverse transformation function are selected from a group of pairs of bijective transformation functions and corresponding inverse transformation functions.

12. The non-transitory computer-readable medium of claim 11 wherein the method comprises:
selecting a second bijective transformation function and a second inverse transformation function;
applying the second bijective transformation function on the secret data, generating second transformed data;
applying the cryptographic calculation function on a second set of data of the input data stream and the second transformed data, generating a third data stream; and applying the second inverse transformation function on the third data stream, generating a second results data stream.

13. The non-transitory computer-readable medium of claim 11 wherein the results data stream is equivalent to application of the cryptographic calculation function on the set of data of the input data stream and the secret data.

14. A system, comprising:
means for applying a bijective transformation function on secret data;
means for applying a cryptographic calculation function on a set of data of an input data stream and an output of the means for applying the bijective transformation function; and
means for applying an inverse transformation function corresponding to the bijective transformation function on an output of the means for applying the cryptographic calculation function, wherein an output of the means for applying the inverse transformation function corresponds to application of the cryptographic calculation function on the set of data of the input data stream and the secret data, and the bijective transformation function and the inverse transformation function are selected from a group of pairs of biiective transformation functions and corresponding inverse transformation functions.

15. The system of claim 14, comprising one or more processing devices configured to implement the means for applying the bijective transformation function, the means for applying the cryptographic calculation function and the means for applying an inverse transformation function.

16. The system of claim 14 wherein the output of the means for applying the inverse transformation function is equivalent to application of the cryptographic calculation function on the set of data of the input data stream and the secret data.

17. A circuit, comprising:
one or more memories; and
one or more processing devices configured to:
apply a bijective transformation function on secret data, generating transformed data;
apply a cryptographic calculation function on a set of data of an input data stream and the transformed data, generating a second data stream, the set of data of the input data stream comprising a plurality of data; and
apply an inverse transformation function corresponding to the bijective transformation function on the second data stream, generating a results data stream, wherein the results data stream corresponds to application of the cryptographic calculation function on the set of data of the input data stream and the secret data, and the bijective transformation function and the inverse transformation function are selected from a plurality of pairs of bijective transformation functions and corresponding inverse transformation functions.

18. The circuit according to claim 17 wherein the one or more processing devices comprises a secure cryptographic calculation circuit configured to:
store the secret data;
apply the bijective transformation function; and
apply the cryptographic calculation function.

19. The circuit according to claim 18 wherein the secure cryptographic calculation circuit is configured to store the transformed data and to use the stored transformed data at a plurality of sequential applications of the cryptographic calculation function.

20. The circuit according to claim 18 wherein the secure cryptographic calculation circuit is configured to:
store the plurality of pairs of bijective transformation functions and corresponding inverse transformation functions;
respond to received indications to select a new pair of functions from among the stored pairs of functions by selecting a second bijective transformation function and a corresponding second inverse transformation function from among the stored plurality of pairs; and
apply the new bijective transformation function on the secret data, generating new transformed data.

21. The circuit according to claim 17 wherein the one or more processing devices are configured to respond to receipt of a new bijective transformation function and a new inverse transformation function by:
applying the new bijective transformation function on the secret data, generating new transformed data;
applying the cryptographic calculation function on a subsequent set of data of the input data stream and the new transformed data, generating a third data stream; and
applying the new inverse transformation function on the third data stream, generating a second results data stream, wherein the second results data stream corresponds to application of the cryptographic calculation function on the subsequent set of data of the input data stream and the secret data.

22. The circuit of claim 21 wherein the one or more processing devices are configured to execute a received set of executable instructions containing the new bijective transformation function and the new inverse transformation function.

23. A circuit, comprising:
one or more memories; and
one or more processing devices configured to:
apply a bijective transformation function on secret data, generating transformed data;
apply a cryptographic calculation function on a set of data of an input data stream and the transformed data, generating a second data stream, the set of data of the input data stream comprising a plurality of data; and
apply an inverse transformation function on the second data stream, generating a results data stream, wherein the results data stream corresponds to application of the cryptographic calculation function on the set of data of the input data stream and the secret data, and applying the cryptographic calculation function on the set of data of the input data stream and the transformed data comprises one of:
applying a modular exponentiation calculation on the set of data of the input data stream, using the transformed data as an exponent; and
multiplying a cryptographic elliptical curve of set of data of the input data stream by the transformed data.

* * * * *

UNITED STATES PATENT AND TRADEMARK OFFICE
CERTIFICATE OF CORRECTION

| | | |
|---|---|---|
| PATENT NO. | : 8,666,067 B2 | Page 1 of 1 |
| APPLICATION NO. | : 13/286962 | |
| DATED | : March 4, 2014 | |
| INVENTOR(S) | : Yannick Teglia | |

It is certified that error appears in the above-identified patent and that said Letters Patent is hereby corrected as shown below:

In the Claims:

Column 9, Line 19
"selected from a group of pairs of biiective transformation" should read, --selected from a group of pairs of bijective transformation--.

Column 11, Line 24
"from a group of pairs of biiective transformation" should read, --from a group of pairs of bijective transformation--.

Signed and Sealed this
Fifth Day of August, 2014

Michelle K. Lee
*Deputy Director of the United States Patent and Trademark Office*